(12) United States Patent
Yoo et al.

(10) Patent No.: US 12,065,027 B2
(45) Date of Patent: Aug. 20, 2024

(54) REDUCER FOR ELECTRIC VEHICLE

(71) Applicants: HYUNDAI MOTOR COMPANY, Seoul (KR); KIA CORPORATION, Seoul (KR)

(72) Inventors: Il Han Yoo, Hwaseong-si (KR); Se Hwan Cheon, Hwaseong-si (KR); Min Su Sun, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/502,369

(22) Filed: Nov. 6, 2023

(65) Prior Publication Data

US 2024/0066967 A1 Feb. 29, 2024

Related U.S. Application Data

(63) Continuation of application No. 17/692,825, filed on Mar. 11, 2022, now Pat. No. 11,845,330.

(30) Foreign Application Priority Data

Jul. 20, 2021 (KR) .................. 10-2021-0095019

(51) Int. Cl.
*F16H 48/40* (2012.01)
*B60K 1/00* (2006.01)
*F16H 57/04* (2010.01)

(52) U.S. Cl.
CPC .............. *B60K 1/00* (2013.01); *F16H 48/40* (2013.01); *F16H 57/043* (2013.01); *F16H 57/0469* (2013.01); *B60K 2001/001* (2013.01); *B60Y 2400/73* (2013.01)

(58) Field of Classification Search
CPC .... F16H 57/043; F16H 57/0469; F16H 48/24; F16H 48/40; B60K 1/00; B60K 2001/001; B60Y 2400/73
USPC ........................................ 475/159, 160, 150
See application file for complete search history.

(56) References Cited

U.S. PATENT DOCUMENTS

| | | | | |
|---|---|---|---|---|
| 5,620,387 | A | * | 4/1997 | Janiszewski ............. B60K 1/00 475/207 |
| 6,068,571 | A | | 5/2000 | Irwin |
| 9,222,565 | B2 | * | 12/2015 | Pichler .................... F16H 48/22 |
| 9,821,654 | B2 | * | 11/2017 | Hart ....................... B60K 17/08 |

(Continued)

FOREIGN PATENT DOCUMENTS

| | | |
|---|---|---|
| CN | 209224929 U | 8/2019 |
| EP | 3456568 A1 | 3/2019 |
| JP | 2020133775 A * | 8/2020 |

OTHER PUBLICATIONS

English translation of JP2020133775A; http://translationportal.epo.org; Mar. 13, 2024 (Year: 2024).*

*Primary Examiner* — Roger L Pang
(74) *Attorney, Agent, or Firm* — MCDONNELL BOEHNEN HULBERT & BERGHOFF LLP

(57) ABSTRACT

The present disclosure provides a reducer for an electric vehicle, the reducer including an input shaft connected to a motor, a differential disposed coaxially with the input shaft and relatively rotatable, a planetary gear train configured to decelerate power of the input shaft and transmit the power to a differential casing of the differential, and a drive shaft configured to penetrate the input shaft and coupled to one side gear of the differential.

12 Claims, 6 Drawing Sheets

(56) References Cited

U.S. PATENT DOCUMENTS

| | | | |
|---|---|---|---|
| 10,781,921 B2* | 9/2020 | Tanaka | F16H 63/3425 |
| 2012/0329597 A1* | 12/2012 | Nomura | F16H 57/0428 |
| | | | 475/149 |
| 2013/0260941 A1* | 10/2013 | Nomura | B60K 17/356 |
| | | | 475/150 |
| 2020/0282828 A1 | 9/2020 | Suyama et al. | |
| 2021/0213819 A1 | 7/2021 | Hibino et al. | |

* cited by examiner

US 12,065,027 B2

REDUCER FOR ELECTRIC VEHICLE

CROSS REFERENCE TO RELATED APPLICATIONS

The present application is a Continuation of U.S. patent application Ser. No. 17/692,825, filed Mar. 11, 2022, which claims priority to Korean Patent Application No. 10-2021-0095019, filed Jul. 20, 2021, the entire contents of which is incorporated herein for all purposes by this reference.

BACKGROUND

Field

The present disclosure relates to a technology related to a structure of a reducer for an electric vehicle.

Description of the Related Art

An electric vehicle operates a driving wheel with power of a motor that operates with electric power. A reducer or the like is disposed between the motor and the driving wheel to provide the driving wheel with the power of the motor after reducing the speed to an appropriate speed.

The reducer used for the electric vehicle needs to have a simple, compact configuration, if possible, have improved vehicle mountability, and implement a sufficient reduction ratio.

The foregoing explained as the background of the disclosure is intended merely to aid in the understanding of the background of the present disclosure, and is not intended to mean that the present disclosure falls within the purview of the related art that is already known to those skilled in the art.

SUMMARY

The present disclosure is proposed to solve these problems and aims to provide a reducer for an electric vehicle, having a simple, compact configuration, a relatively short overall length, and improved vehicle mountability, reduces a weight and costs, ensures improved assembly properties and maintainability, and implements improved durability.

An exemplary embodiment of the present disclosure provides a reducer for an electric vehicle, the reducer including an input shaft connected to a motor, a differential disposed coaxially with the input shaft and installed to be relatively rotatable, a planetary gear train configured to decelerate power of the input shaft and transmit the power to a differential casing of the differential, and a drive shaft configured to penetrate the input shaft and coupled to one side gear of the differential.

The planetary gear train may include a sun gear provided on the input shaft, a carrier engaging with the differential casing, and a ring gear fixed to a casing.

Planetary pinions rotatably supported on the carrier may include a first stage pinion engaging with the sun gear, and a second stage pinion engaging with the ring gear, and the first stage pinion may have a larger diameter than the second stage pinion.

The carrier and the differential casing may engage with each other by a spline by sliding in an axial direction.

An end of the input shaft may be inserted into the differential casing, and a first bearing may be installed between an inner circumferential surface of the differential casing and an outer circumferential surface of the input shaft.

The input shaft may be supported on the casing by a second bearing and a third bearing disposed to be spaced apart from each other in an axial direction, and the differential casing may be supported by a fourth bearing on the casing at a position spaced apart from the first bearing in the axial direction.

An oil supply part may be provided in the casing to supply oil through a space between the input shaft and the drive shaft, and the oil supply part may be formed to supply the oil to a gap between the end of the input shaft and the drive shaft.

A parking gear may be provided on the carrier.

A spline may be formed between an outer circumferential surface of the carrier and an inner circumferential surface of the parking gear so that the parking gear is coupled to the outer circumferential surface of the carrier by sliding in an axial direction.

A pin insertion port for fixing a pinion shaft may be provided in the differential casing and opened toward the carrier of the planetary gear train.

The present disclosure may provide the reducer for an electric vehicle, which has a simple, compact configuration, a relatively short overall length, and excellent vehicle mountability, reduces a weight and costs, ensures excellent assembly properties and maintainability, and implements excellent durability.

DETAILED DESCRIPTION

Figure 1:
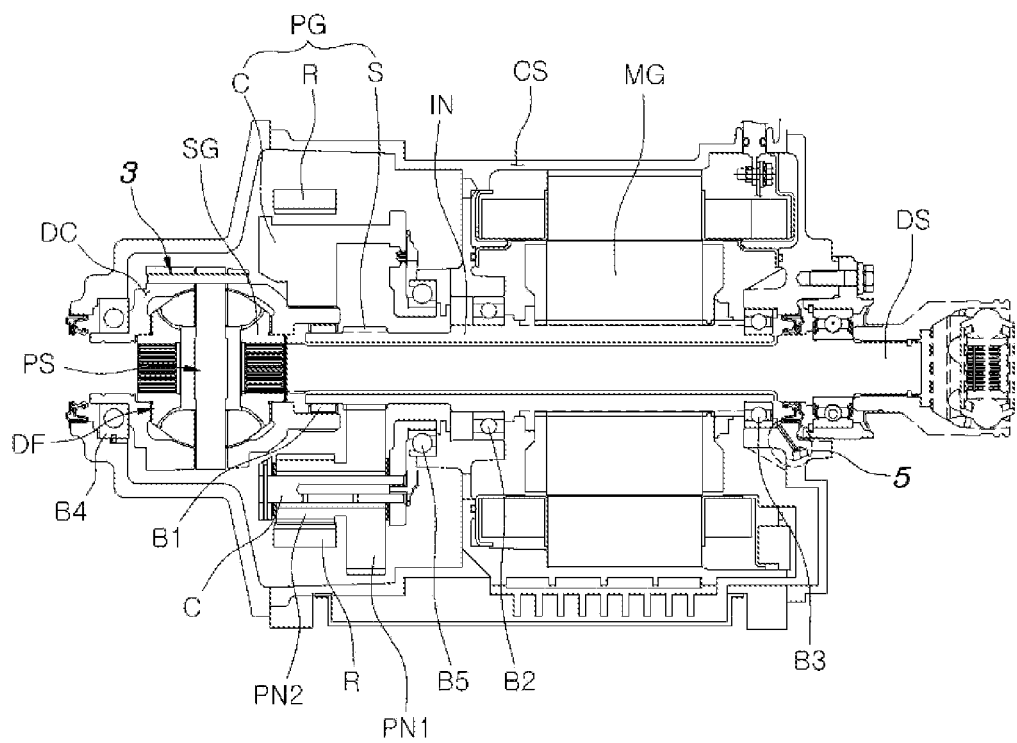
FIG. 1 is a view illustrating a first embodiment of a reducer for an electric vehicle according to the present disclosure.
Figure 2:
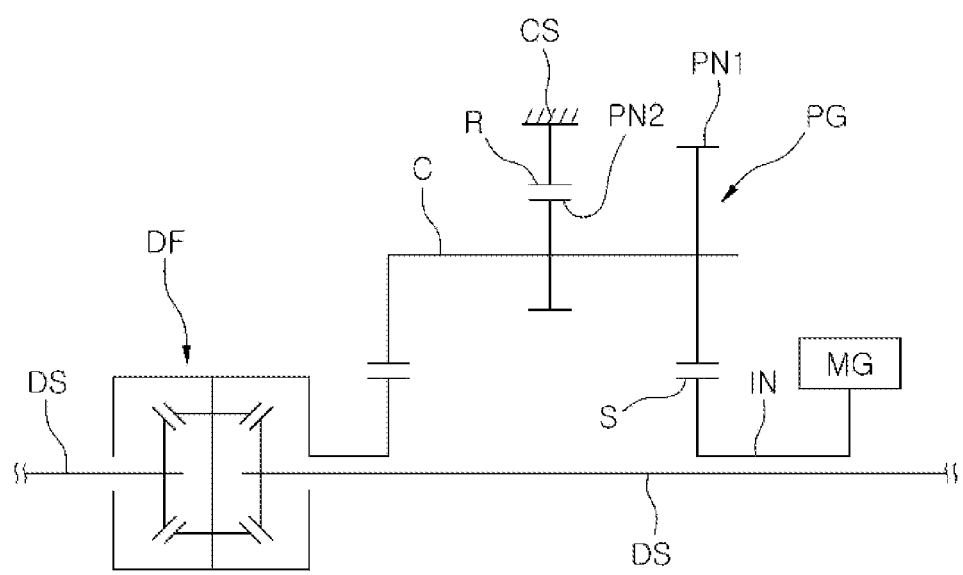
FIG. 2 is a structural view briefly illustrating a structure illustrated in FIG. 1.

Specific structural or functional descriptions of exemplary embodiments of the present disclosure disclosed in this specification or application are exemplified only for the purpose of explaining the exemplary embodiments according to the present disclosure, the exemplary embodiments according to the present disclosure may be carried out in various forms, and it should not be interpreted that the present disclosure is limited to the exemplary embodiments described in this specification or application.

Because the exemplary embodiments according to the present disclosure may be variously changed and may have various forms, specific exemplary embodiments will be illustrated in the drawings and described in detail in the present specification or application. However, the descriptions of the specific exemplary embodiments are not intended to limit exemplary embodiments according to the concept of the present disclosure to the specific exemplary embodiments, but it should be understood that the present disclosure covers all modifications, equivalents and alternatives falling within the spirit and technical scope of the present disclosure.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present disclosure. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present disclosure pertains. The terms such as those defined in a commonly used dictionary should be interpreted as having meanings consistent with meanings in the context of related technologies and should not be interpreted as ideal or excessively formal meanings unless explicitly defined in the present specification.

Hereinafter, an exemplary embodiment of the present disclosure will be described in detail with reference to the accompanying drawings. Like reference numerals indicated in the respective drawings refer to like members.

Referring to FIGS. 1 to 6, an embodiment of a reducer for an electric vehicle according to the present disclosure includes: an input shaft IN connected to a motor MG, a differential DF disposed coaxially with the input shaft IN and installed to be relatively rotatable, a planetary gear train PG configured to decelerate power of the input shaft IN and transmit the power to a differential casing DC of the differential DF, and a drive shaft DS configured to penetrate the input shaft IN and coupled to one side gear SG of the differential DF.

That is, according to the present disclosure, when the power of the motor MG is inputted through the input shaft IN, the planetary gear train reduces the speed and then outputs the power to the differential DF. One of the two drive shafts DS, which transmit power to two driving wheels from the differential DF, penetrates the input shaft IN as described above.

The planetary gear train includes a sun gear S disposed on the input shaft IN, a carrier C engaging with the differential casing DC, and a ring gear R fixed to a casing CS.

That is, the power inputted to the sun gear S from the input shaft IN is decelerated by the carrier C and transmitted to the differential casing DC.

Planetary pinions rotatably supported on the carrier C includes a first stage pinion PN1 engaging with the sun gear, and a second stage pinion PN2 engaging with the ring gear R. The first stage pinion PN1 may have a larger diameter than the second stage pinion PN2.

Therefore, the planetary gear train implements a reduction ratio determined by a ratio of number of teeth between the first stage pinion PN1 and the second stage pinion PN2 in addition to a reduction ratio determined by the number of teeth of the sun gear S and the ring gear R. Therefore, the number of components and weight required to configure the planetary gear train PG may be reduced, and a relatively high reduction ratio may be implemented.

The carrier C and the differential casing DC may engage with each other through a spline coupled to be slidable in an axial direction.

Therefore, the differential DF may be easily assembled with the carrier C of the planetary gear train PG only by sliding in the axial direction, and the differential DF may also be easily disassembled, thereby ensuring improved assembly properties and maintainability.

In addition, according to the configuration modularized to easily couple and disassemble the planetary gear train PG and the differential DF, an additional planetary gear train, instead of the differential DF, may be easily assembled with the carrier C, such that the configuration may be easily modified to increase a gear ratio of the reducer.

For reference, the term 'axial direction' may be understood as meaning an axial direction of the input shaft IN.

An end of the input shaft IN is inserted into the differential casing DC. A first bearing B1 is installed between an inner circumferential surface of the differential casing DC and an outer circumferential surface of the input shaft IN.

The input shaft IN is supported by a second bearing B2 and a third bearing B3 disposed to be spaced apart from each other in the axial direction of the casing CS. The differential casing DC is supported on the casing CS by a fourth bearing B4 at a position spaced apart from the first bearing B1 in the axial direction.

Therefore, the input shaft IN is stably and rotatably supported on the casing CS by the second bearing B2 and the third bearing B3. The differential casing DC is stably and rotatably supported by the first bearing B1 and the fourth bearing B4.

That is, one side of the differential casing DC is supported on the casing CS by the fourth bearing B4, and the other side of the differential casing DC is supported on the casing CS by the first bearing B1 through the input shaft IN. Therefore, a separate bearing for supporting the other side of the differential casing DC directly on the casing CS need not be provided, and an intermediate wall or the like need not be provided on the casing CS to mount the bearing. Therefore, it is possible to reduce the overall length and weight of the reducer.

In addition, in the present embodiment, as illustrated in FIG. 1, the carrier C of the planetary gear train PG is positioned to overlap the input shaft IN, the first bearing B1, and the differential casing DC and disposed at the position at which the input shaft IN, the first bearing B1, and the differential casing DC overlap in the radial direction. As a result, it is possible to reduce the overall length of the reducer.

For reference, on the right side of the third bearing B3 in FIG. 1, a casing-drive shaft bearing is provided to support the drive shaft DS for rotation relative to the casing CS.

Figure 3:
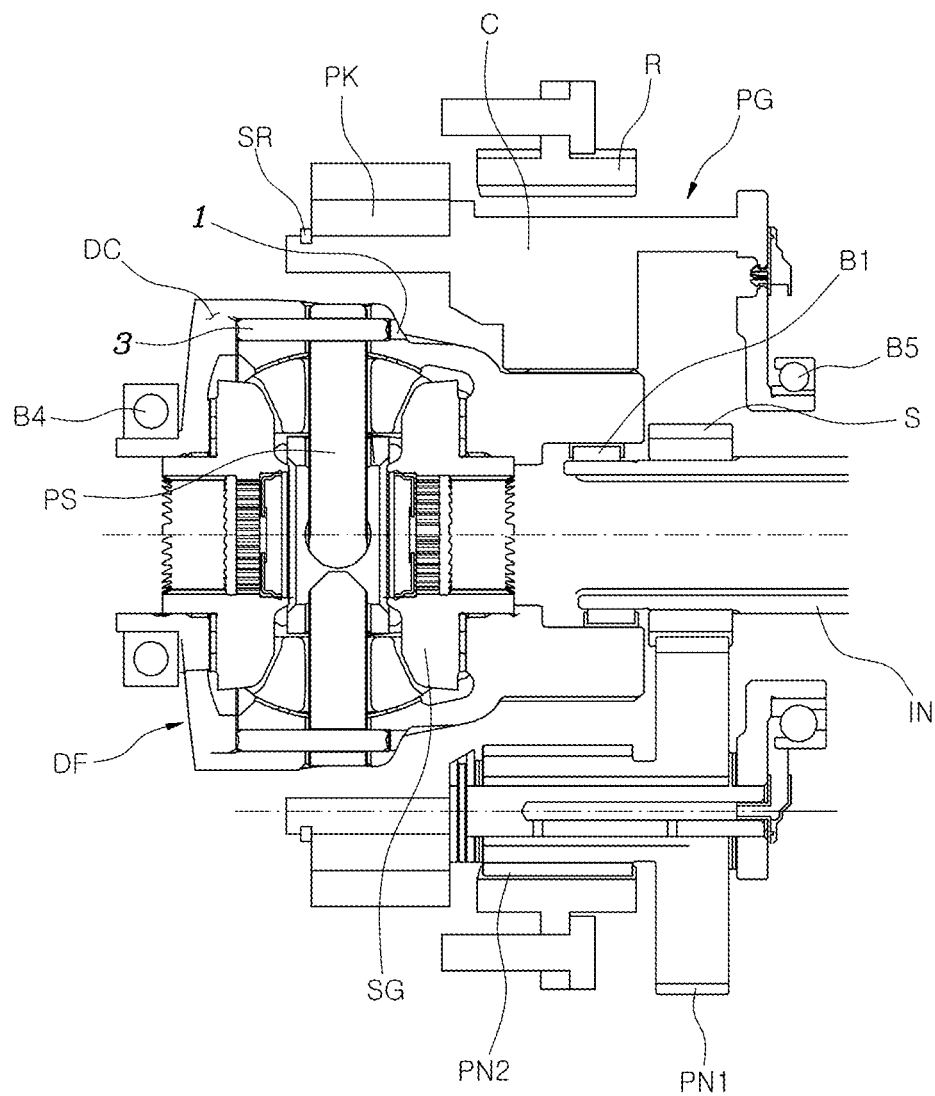
FIG. 3 is a view illustrating a second embodiment made by adding a parking gear to a configuration illustrated in FIG. 1.

Meanwhile, in the second embodiment illustrated in FIG. 3, a parking gear PK is provided on the carrier C, and the other components are almost identical to those in the first embodiment.

For example, as illustrated in FIG. 3, the parking gear PK may be assembled with the carrier C.

That is, a spline is formed between an outer circumferential surface of the carrier and an inner circumferential surface of the parking gear PK so that the parking gear PK may be coupled by sliding in the axial direction on the outer circumferential surface of the carrier C. The parking gear PK is inserted into the carrier C using the spline and then fixed by a snap ring SR or the like.

For reference, unlike FIG. 1, the carrier C extends toward the differential DF to install the parking gear PK at the portion where the parking gear PK is installed, but the other components illustrated in FIG. 3 are identical to those illustrated in FIG. 1.

Therefore, since the overall length of the reducer for installing the parking gear PK is not separately increased, the configuration above may ultimately reduce the overall length of the reducer.

A pin insertion port 1 for fixing a pinion shaft PS is formed in the differential casing DC and opened toward the carrier C of the planetary gear train PG.

Therefore, in a state in which a fixing pin 3 for fixing the pinion shaft PS is inserted into the pin insertion port 1, the carrier C is positioned outside the fixing pin 3, thereby preventing the fixing pin 3 from being completely separated from the differential casing DC. The differential casing DC and the carrier C have the same rotational speed even though the fixing pin 3 is in contact with the carrier C. Therefore, damage to the fixing pin 3 and the differential casing DC is prevented.

An oil supply part 5 is provided in the casing CS to supply oil through a space between the input shaft IN and the drive shaft DS. The oil supply part 5 is formed to supply the oil to a gap between the end of the input shaft IN and the drive shaft DS.

Therefore, the oil pumped to the oil supply part 5 by an oil pump or the like may lubricate the third bearing B3 at the position adjacent to the oil supply part 5 and also effectively lubricate the first bearing B1 by flowing along the gap between the input shaft IN and the drive shaft DS.

In addition, an oil hole is additionally formed in the input shaft IN, such that the oil for lubricating the second bearing B2 may be supplied from the gap between the input shaft IN and the drive shaft DS. Further, the oil required to lubricate a fifth bearing B5 for supporting the carrier on the casing CS in FIG. 1 may be supplied by a method like the method of lubricating the second bearing B2.

Figure 4:
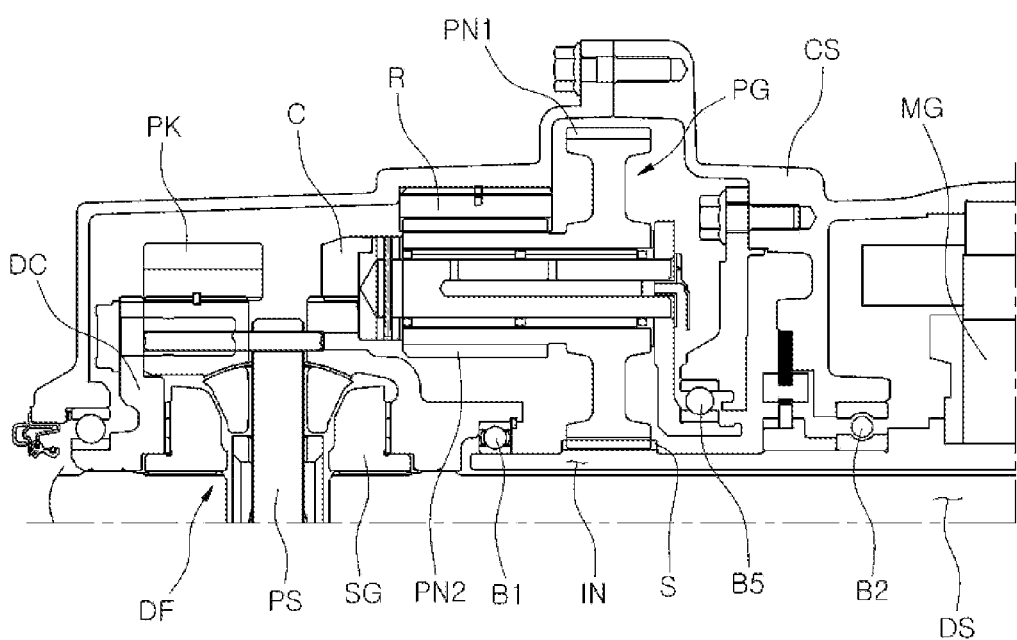
FIG. 4 is a view illustrating a third embodiment of the reducer for an electric vehicle according to the present disclosure.

Meanwhile, in the third embodiment illustrated in FIG. 4, the parking gear PK is installed on the differential casing DC, and the other components are almost identical to those in the first embodiment.

Figure 5:
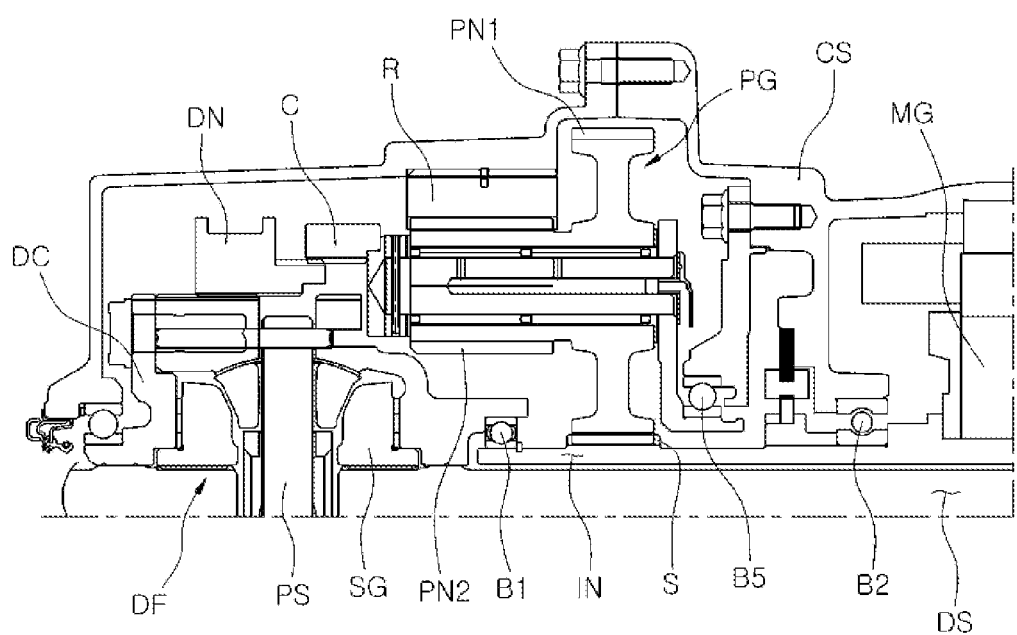
FIG. 5 is a view illustrating a fourth embodiment of the reducer for an electric vehicle according to the present disclosure.

In addition, in the fourth embodiment illustrated in FIG. 5, a disconnector DN is slidably provided in the differential casing DC to engage or disengage the differential casing DC and the carrier C, and the other components are almost identical to those in the first embodiment.

When the vehicle operates with the motor MG, the disconnector DN maintains the connected state to transmit the power from the motor MG to the differential DF. However, when the vehicle coasts, the disconnector DN may disconnect the differential DF and the motor MG to allow the vehicle to continue to coast for a long period of time in a state in which inertia resistance caused by the motor MG is excluded. As a result, it is possible to improve the efficiency of the vehicle.

Figure 6:
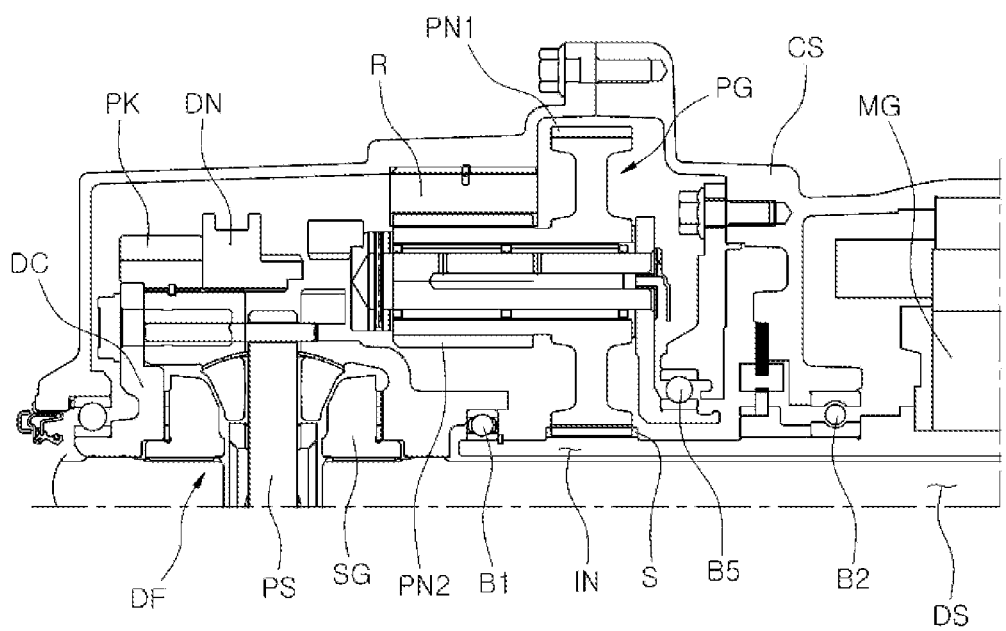
FIG. 6 is a view illustrating a fifth embodiment of the reducer for an electric vehicle according to the present disclosure.

In addition, in the fifth embodiment illustrated in FIG. 6, both the parking gear PK and the disconnector DN are installed in the differential casing DC.

While the specific embodiments of the present disclosure have been illustrated and described, it will be obvious to those skilled in the art that the present disclosure may be variously modified and changed without departing from the technical spirit of the present disclosure defined in the appended claims.

The invention claimed is:

1. A reducer for an electric vehicle, the reducer comprising:
   an input shaft connected to a motor;
   a differential disposed coaxially with the input shaft and being rotatable relative to the input shaft;
   a reduction device configured to decelerate power of the input shaft and to transmit the power to a differential casing of the differential;
   a drive shaft coupled to one side gear of the differential and configured to penetrate the input shaft; and
   a disconnector configured to connect or disconnect a power transmission path between the input shaft and the differential casing;
   wherein an end of the input shaft is inserted into the differential casing, and a first bearing is positioned between an inner circumferential surface of the differential casing and an outer circumferential surface of the input shaft;
   wherein the input shaft is supported on a casing by a second bearing and a third bearing spaced apart from each other in an axial direction, and the differential casing is supported by a fourth bearing on the casing at a position spaced apart from the first bearing in the axial direction; and
   wherein the reduction device is supported by a fifth bearing on the casing between the first bearing and the second bearing in the axial direction.

2. The reducer of claim 1, wherein the reduction device comprises:
   a sun gear provided on the input shaft;
   a ring gear fixed to a casing; and
   a planet gear engaging with the sun gear and the ring gear.

3. The reducer of claim 1, wherein the disconnector is configured to connect or disconnect the reduction device and the differential casing.

4. The reducer of claim 3, wherein the reduction device comprises:
   a sun gear provided on the input shaft;
   a ring gear fixed to a casing;
   a planet gear engaging with the sun gear and the ring gear; and
   a carrier configured to support a rotary shaft of the planet gear, and wherein the disconnector is configured to connect or disconnect the differential casing and the carrier.

5. The reducer of claim 4, wherein the disconnector is configured to engage with the carrier by rectilinearly sliding in an axial direction in the differential casing.

6. The reducer of claim 5, wherein a parking gear is positioned on the differential casing, and the parking gear restricts a movement of the disconnector in a direction opposite to a direction in which the disconnector slides toward the carrier.

7. The reducer of claim 1, wherein a casing-drive shaft bearing is positioned on a casing configured to be penetrated by the drive shaft, and the casing-drive shaft bearing supports the drive shaft so that the drive shaft is rotatable.

8. A reducer for an electric vehicle, the reducer comprising: a motor provided in a casing; an input shaft configured to penetrate the motor; a differential installed in the casing and disposed coaxially with the input shaft; a reduction device configured to decelerate power of the input shaft and transmit the power to a differential casing of the differential; a drive shaft coupled to one side gear of the differential and configured to penetrate the input shaft; a casing-drive shaft bearing configured to support the drive shaft on the casing so that the drive shaft is rotatable; and a disconnector configured to connect or disconnect the reduction device and the differential casing; wherein the reduction device comprises; a sun gear provided on the input shaft; a ring gear fixed to a casing; a planet gear engaging with the sun gear and the ring gear; and a carrier configured to support a rotary shaft of the planet gear, wherein the disconnector is configured to connect or disconnect the carrier and the differential casing;

wherein the disconnector and a parking gear are positioned on the differential casing, and the disconnector is configured to engage with the carrier by rectilinearly sliding in a direction opposite to a side at which the parking gear is installed.

9. The reducer of claim 8, wherein one end of the differential casing is rotatably supported by a first bearing between the input shaft and the differential casing, and another end of the differential casing is rotatably supported by a fourth bearing between the casing and the differential casing.

10. The reducer of claim 8, wherein the input shaft is supported on the casing at two opposite sides of the motor by a second bearing and a third bearing.

11. The reducer of claim 10, wherein an oil supply part is provided in the casing and configured to supply oil to a gap between the drive shaft and an end of the input shaft supported by the third bearing, and an oil hole is formed in the input shaft to supply the oil, which flows in the input shaft, to the second bearing.

12. The reducer of claim 8, wherein the reduction device is rotatably supported on the casing by a fifth bearing.

* * * * *